(12) United States Patent
Welles

(10) Patent No.: US 6,464,506 B1
(45) Date of Patent: Oct. 15, 2002

(54) INFORMATION AND MEDICATION COMPLIANCE ORGANIZER

(76) Inventor: Nancy Dickerson Welles, P.O. Box 218, Oriental, NC (US) 28571

( * ) Notice: Subject to any disclaimer, the term of this patent is extended or adjusted under 35 U.S.C. 154(b) by 0 days.

(21) Appl. No.: 09/698,940

(22) Filed: Oct. 30, 2000

(51) Int. Cl.[7] .................. G09B 19/00; B65D 83/04; B65D 85/42
(52) U.S. Cl. .................. 434/238; 206/534; 206/538; 206/459.5
(58) Field of Search .................. 434/238; 40/359, 40/312, 311; 211/74–75; 206/534, 538, 459.5

(56) References Cited

U.S. PATENT DOCUMENTS

| | | | |
|---|---|---|---|
| 917,914 A | * 4/1909 | Otteren | 211/87.01 |
| 2,581,019 A | * 1/1952 | Heide | 108/152 |
| 3,225,913 A | 12/1965 | Lee | |
| D207,411 S | * 4/1967 | Diesinger | 211/76 |
| D252,429 S | * 7/1979 | Morin | D6/569 |
| 4,288,013 A | * 9/1981 | Napier | 206/145 |
| D262,337 S | * 12/1981 | Bateman et al. | D6/572 |
| 4,318,477 A | 3/1982 | Kerpe | |
| 4,473,156 A | * 9/1984 | Martin | 116/308 |
| 4,518,208 A | * 5/1985 | Marder | 211/74 |
| 4,749,085 A | 6/1988 | Denney | |
| 4,883,180 A | * 11/1989 | Humphrey et al. | 206/534 |
| 4,889,237 A | 12/1989 | Brandon | |
| 4,905,388 A | 3/1990 | Sinkow | |
| D310,848 S | 9/1990 | Perbix | |
| 5,031,937 A | 7/1991 | Nellhaus | |
| 5,558,229 A | 9/1996 | Halbich | |
| 5,704,495 A | * 1/1998 | Bale et al. | 211/71.01 |
| 5,788,079 A | * 8/1998 | Bouthiette | 206/534 |
| 6,041,932 A | 3/2000 | Holmberg | |

* cited by examiner

*Primary Examiner*—Derris H. Banks
*Assistant Examiner*—Dmitry Suhol
(74) *Attorney, Agent, or Firm*—Mills Law Firm PLLC

(57) ABSTRACT

The medication compliance organizer takes the form of a magnetized panel that may be conveniently mounted on the front of an appliance such as a refrigerator, or alternatively conventionally hung on a wall or other suitable surface. The organizer includes a plurality of day and time based containers for organizing and releasably holding the medications, typically four vials in vertical columns for each day of the week, one for each prescription time interval, i.e. morning, noon, evening and bedtime. The individual containers are sufficiently large to handle the varying medication formats from tablets, elixirs and patches. The organizer further includes an open tray for holding other medications and peripheral supplies, a reminder area for writing reminders regarding specific medications or activities, and medical forms for reference by the patient, care givers and health care personnel.

5 Claims, 8 Drawing Sheets

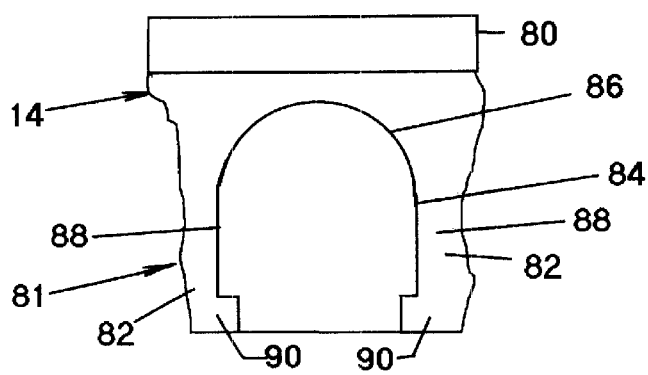
FIG. 3
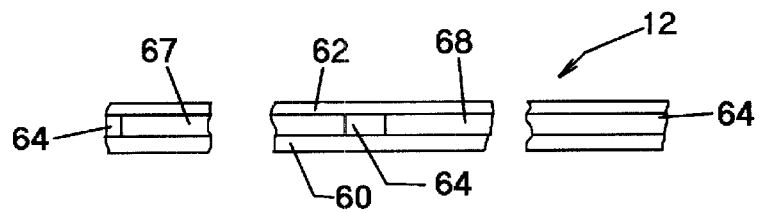
FIG. 4
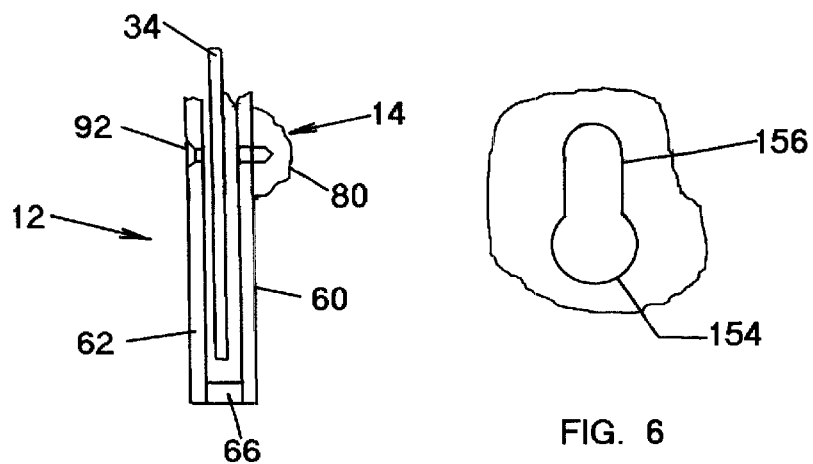
FIG. 5
FIG. 6

MEDICATIONS

Print Patient Name Here

CURRENT MEDICATIONS (for filling containers)

| | DRUG NAME | DOSE | ROUTE | FREQUENCY | COMMENTS |
|---|---|---|---|---|---|
| 1. | | | | | |
| 2. | | | | | |
| 3. | | | | | |
| 4. | | | | | |
| 5. | | | | | |
| 6. | | | | | |
| 7. | | | | | |
| 8. | | | | | |
| 9. | | | | | |
| 10. | | | | | |
| 11. | | | | | |
| 12. | | | | | |
| 13. | | | | | |
| 14. | | | | | |
| 15. | | | | | |
| 16. | | | | | |
| 17. | | | | | |

OTHER CURRENT MEDICATIONS

1.

2.

3.

4.

5.

6.

7.

Prepared By:

Date Prepared:

FIG. 7

MEDICATIONS

| Bedtime | Evening | Noon | Morning | |
|---------|---------|------|---------|---|
| | | Print Patient Name Here | | |
| | | | | Sunday |
| | | | | Monday |
| | | | | Tuesday |
| | | | | Wednesday |
| | | | | Thursday |
| | | | | Friday |
| | | | | Saturday |

FIG. 8

EMERGENCY/MEDIDICAL

Name:  
Address:

Phone No.:  
Date of Birth:  
Social Security #:

In case of emergency, please contact:  
Name:  
Address:

Phone No.: Home: Work:  
Cellular:

MEDICAL INFORMATION

- Medical History:

- Surgical History:

- Allergies:

- Living Will: Yes/No   (Copy Kept:
- Organ Donor: Yes/No

- Blood Type:
- Height:
- Weight:

MEDICATIONS

| DATE | DRUG | DOSE | ROUTE | FREQUENCY | REASON FOR TAKING | PRESCRIBING MD | D/C DATE |
|------|------|------|-------|-----------|-------------------|----------------|----------|
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |
|      |      |      |       |           |                   |                |          |

DOCTORS

| Doctor's Name | Phone No. | Specialty |
|---------------|-----------|-----------|
|               |           |           |
|               |           |           |
|               |           |           |
|               |           |           |
|               |           |           |

FIG. 9

EMERGENCY/MEDICAL

EMERGENCY

- Police:
- Fire:
- Ambulance:
- Hospital:
- Poison Control:
- Local Pharmacy:

SERVICES

- Water Co.:
- Electric Co.:
- Gas Co.:
- Phone Co.:

FAMILY

- Son:
- Son:
- Daughter:
- Daughter:

NEIGHBORS

- 
- 
-

PERSONAL REQUESTS/ INSTRUCTIONS

FIG. 10

INFORMATION AND MEDICATION COMPLIANCE ORGANIZER

GOVERNMENT RIGHTS

This invention was made with government support under Grant No. IR43 NR05021-01 awarded by the National Institutes of Health. The Government has certain rights in the invention.

FIELD OF THE INVENTION

The present invention relates to devices for increasing medication compliance and, in particular, to a comprehensive medication compliance organizing system for increasing the medication compliance of the elderly and impaired persons, and for documenting and communicating, at a single site, pertinent medical and emergency information between user, care givers, and health care providers.

BACKGROUND OF THE INVENTION

Non-compliance with medication regimens represents a significant health care problem to the elderly who, for proper treatment and health maintenance, require medications in a variety of forms to be dispensed at discrete times, and in differing combinations. It is estimated that 25–49% of all people taking prescribed medications are non-compliant (Ref. 1–4). At greater risk are the elderly where 50 to 75% are considered non-compliant (Ref. 3,5). Categorically, the elderly are at higher risk for non-compliance due to the number of medications they consume (Ref. 3,6). Whereas, the elderly represent about 13% of the total population, they purchase 31% of all prescription drugs (Ref. 9). In 1995 medication related incidences wherein non-compliance was an important factor, resulted in $76.6 billion in direct medical costs (Ref. 4,7). Furthermore, an estimated one-third of hospitalizations and one-half of nursing home admission for the elderly were linked to non-compliance or medication errors resulting in Medicare expenditures of $20.6 billion (Ref. 8). Indirect costs from non-compliance resulting from loss of productivity, lost time at work, emotional tolls, disability/morbidity, and loss of life are likewise significant. In addition to the afflicted individual, the families and care givers are also affected. Further, poor compliance attenuates benefits in evaluating drug efficacy and treatment outcomes (Ref. 2, 10).

Inasmuch as the elderly sector of the population is dramatically increasing, the foregoing problem will correspondingly increase. Many factors are associated with non-compliance by the elderly. With increasing age comes increased clinical problems associated with senescence and senility. Cognitive and physical functioning decline. Keeping the elderly healthy, safe, and independently functioning is not only beneficial to the individual for financial and quality of life reasons, but also to society as a whole by decreasing the care and financial burden on care givers and health care systems alike. It is recognized that decreasing the consequence of non-compliance may have a greater impact on health than any other treatment (Ref. 10).

In seeking to address the foregoing, various medication aids have been proposed including pill boxes, containers, calendars, identification cards, and electronic devices. While helpful to a degree, they do not provide a complete and flexible response to the numerous factors influencing non-compliance. Such approaches do not provide comprehensive organization of all medication components, focus the medications at a single site, or provide ongoing reminding of the medication regimen. Studies have revealed several disadvantages. Specialized pill boxes and containers are oftentimes difficult to open, prone to content spillage, non-accommodating of complex regimens, and difficult for observing and confirming contents and compliance. Calendars have similar limitations. Pharmacy filled and sealed containers provide increased visibility and flexibility, but are costly in terms of preparation time and packaging, and lack the ability to add or delete drugs once packaged (Ref. 6, 12). Electronic devices provide reminders, but lack specificity as to the medication and are not integrated with the organization and housing of the medications. Identification cards while providing identification and reminding do not organize the medications. Also the medications associated with emergency room visits for non-compliance are delivered in formats not accommodated by the foregoing memory aids including, for instance, insulin, phenytoin and meter-dosage inhalants (Ref. 7).

An example of the foregoing limitations is disclosed in U.S. Pat. No. 4,905,388 to Sinkow wherein a monthly calendar format provides a receptacle for each day of the month for containers holding tabular medications for the entire day. The device is limited to the pill format and does not provide for differing medicating times. A similar pill carrier is disclosed in U.S. Pat. No. 3,225,913 to Lee wherein a hinged lid may be pivoted to gain access to the table and capsule medications for each day of the month.

U.S. Pat. No. 5,032,937 to Nellhause discloses a weekly calendar wherein stamps are used for visually indicating the medications to be taken during the course of the day. The calendar does not handle multiple medications and is not housed therewith.

U.S. Pat. No. 4,889,237 to Brandon discloses a monthly calendar having daily panels to which a multi-compartment pill container is attached. The device is limited to small pills.

U.S. Pat. No. 6,041,932 to Holmberg discloses a device having sets of packets for each day of the week with a subset of packets for differing times of the day whereby tablets may be selected by the user. U.S. Pat. No. 4,749,085 to Denney discloses a similar pill holder wherein the individual pill cases can be removed and carried by the user. A further weekly device is disclosed in U.S. Pat. No. 4,318,477 to Kerpe wherein the individual containers are sized to receive differing medication formats.

U.S. Pat. No. 5,558,229 to Halbich discloses a medication holder wherein a single days supply of pills may be removed by the user.

BRIEF SUMMARY OF THE INVENTION

A medication compliance organizer in accordance with the present invention provides the user with a system for assisting individuals in taking medications as prescribed and, enhancing the flow of important medical information among individuals, care givers and health care providers. The organizer is a complete and comprehensive system for housing all room temperature medications and serves as a reminder for all other medications. The system's design features large and color coded components utilizing the user's visual senses for enhancing memory recognition, facilitates use by the visually and dexterity impaired, and enables users to have a single convenient location for all medications, information and reminders. The system houses two forms. One form outlines the prescribed medications in chart and written format, and the other contains emergency and medical information specific to the user.

The medication compliance organizer takes the form of a magnetized panel that may be conveniently mounted on the front of an appliance such as a refrigerator, or alternatively conventionally hung on a wall or other suitable surface. The organizer includes a plurality of day and time based containers for organizing and releasably holding the medications. Typically four vials are provided in seven vertical columns for each day of the week, and each prescription time interval, i.e. morning, noon, evening and bedtime. The individual containers are sufficiently large to handle the varying medication formats from tablets, elixirs and patches. Each organizer includes separate containers for handling each time interval of the prescribed medications for each day of the week. The organizer further includes an open tray for holding peripheral supplies and other medications such as drops, ointments and inhalers. The organizer also includes a reminder area for writing reminders regarding specific medications or activities, and removable patient and medical forms for reference by care givers and health care personnel.

The present invention thus overcomes the noted deficiencies of prior approaches by providing a simple and practical organizer that meets the needs of the elderly. The organizer is flexible, changeable, and comprehensive offering organization, single site housing of medications, and visually based reminders for even the most complicated drug regimens. The organizer is adapted for mounting in convenient accessible and visible locations such as a refrigerator or other frequently visited locations.

Assistance information is incorporated through removable forms disposed at the rear of the organizer. The forms identify medications in chart and written format and provide complete, accurate medical and emergency information on the user. The medication form is intended to assist the user or care giver in filling the organizer correctly. The emergency/medical form is intended for use by the user, care givers, and health care providers as a communication tool and for transport to medical appointments, emergency room visits, hospital admissions, or use in response to emergency calls.

Accordingly, it is an object of the present invention to provide an organizer for all medications that organizes daily medicine in all formats at a single site in a clear, visually relevant presentation.

Another object of the invention is to provide a medication device allocating prescribed medications in all common formats at a single site for clear identification by the user and for providing visual feedback to users and care givers regarding compliance with a medication regimen.

A further object of the invention is to provide a medication assembly having discrete containers for carrying all room temperature medication formats allocated and labeled in accordance with prescribed day and time.

Yet another object of the invention is to provide a medication organization, reminder and information product for convenient use by the elderly population notwithstanding visual, memory or dexterity limitations.

Yet a further object of the invention is to provide an area to write reminders to the user regarding all other medications not housed in the individual containers such as insulin injections, inhalers, ointments and drops as well as specifics about medications that are housed in the containers.

DESCRIPTION OF THE DRAWINGS

The above and other features and advantages of the present invention will become apparent upon reading the following detailed description taken in conjunction with the accompanying drawings in which:

FIG. 3 is an enlarged fragmentary top view of the container slot;

FIG. 4 is a fragmentary longitudinal cross sectional view of the support panel assembly;

FIG. 5 is a fragmentary cross sectional view illustrating the mounting of the container racks;

FIG. 6 is a fragmentary rear view of the mounting slots for attaching the organizer to a vertical surface;

FIG. 7 is a front view of the medication form for the organizer;

FIG. 8 is a rear view of the medication form for the organizer;

FIG. 9 is a front view of the emergency/medical form for the organizer;

FIG. 10 is a rear view of the emergency/medical form for the organizer; and

DETAILED DESCRIPTION OF THE PREFERRED EMBODIMENTS

Figure 1:
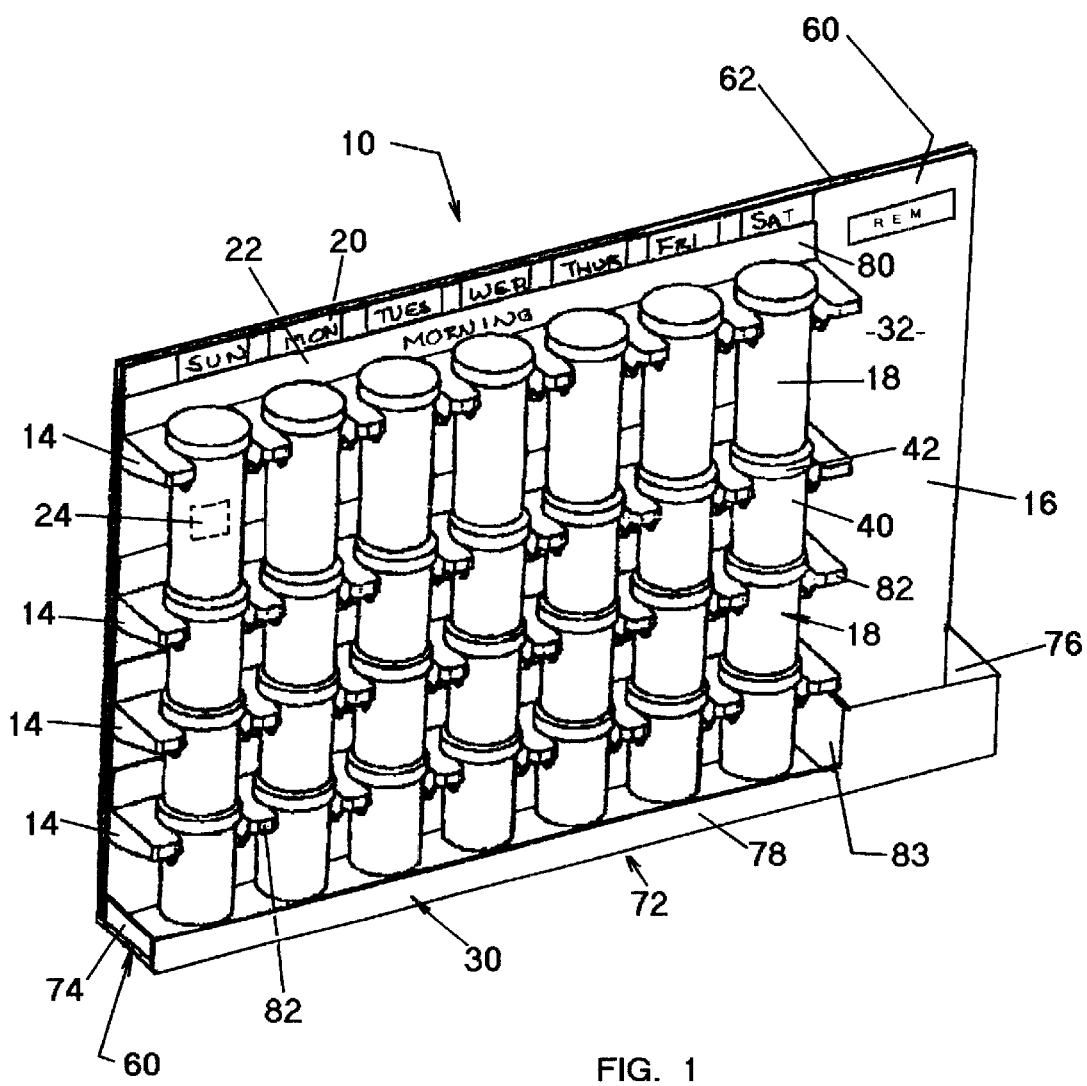
FIG. 1 is a front perspective view of a medication compliance organizer in accordance with an embodiment of the invention.

Referring to the drawings for the purpose of describing the preferred embodiments of the present invention and not for limiting same, FIG. 1, there is shown a medication compliance organizer 10 for assisting patient users with taking their medications as prescribed and enhancing the dissemination of important medical information relative to the user among care givers, health care providers and emergency personnel. The organizer is a complete and comprehensive product designed to house, at a single location, all prescribed room temperature medications and provide visual reminders regarding other medications housed elsewhere. The organizer utilizes the visual senses of the user to enhance significantly memory, provides convenience and accessibility for the visually and dexterity impaired, and enables users to go to a single site for all medications and reminders. Information forms housed in the organizer describe medications in chart and written format, and emergency and medical information specific to the user.

Figure 2:
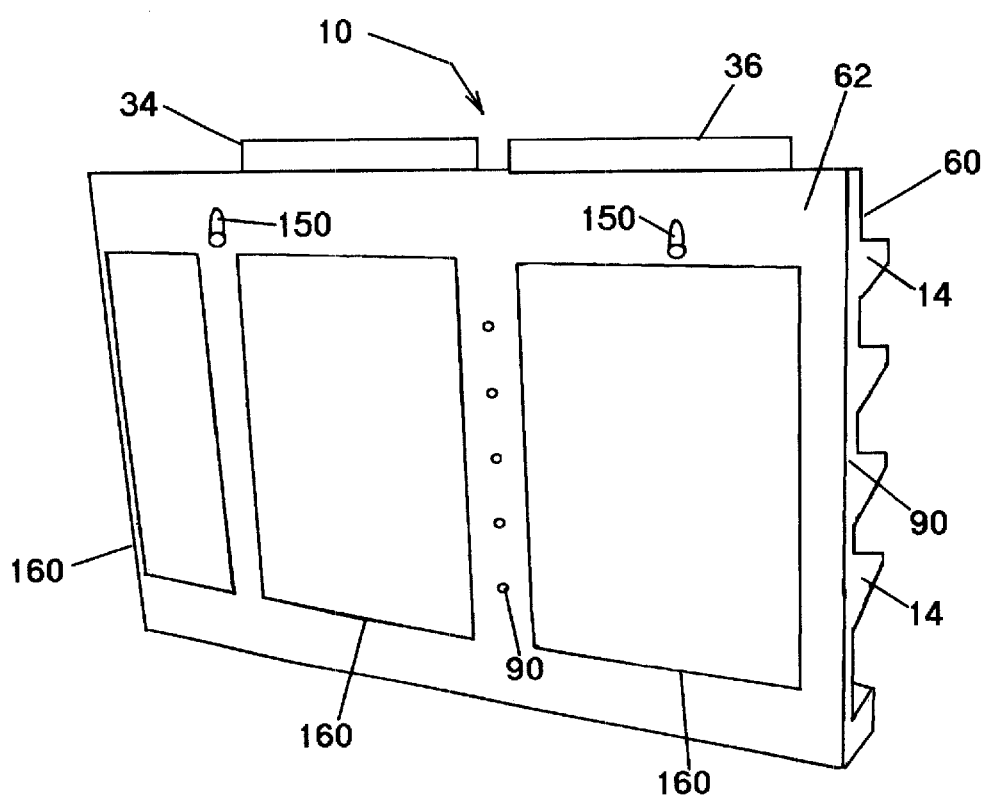
FIG. 2 is a rear perspective view of the organizer illustrated in FIG. 1.

More particularly, the organizer 10 comprises generally rectangular, vertically disposed support assembly 12 having a plurality of vertically spaced, horizontally extending container racks 14 adjustably connected to the front surface 16 thereof and releasably carrying a plurality of laterally spaced medication containers 18. As illustrated, four racks 14 are provided, each carrying seven containers 18. Thus for a week's supply of medications taken four times a day, twenty-eight containers are provided. Accordingly, each column represents a day of the week designated by indicia 20 and each row represents a time of day as represented by indicia 22. Alternatively, the days of the week may be in horizontal rows and the time of day in vertical columns. Each indicia may be color coded, individually or collectively. Additionally, each container may individually carry indicia 24 designating the day and time of day for the user to take the contents thereof. Further, the organizer 10 included a walled supply tray 30 at a lower corner thereof and a reminder area 32 thereabove for inscribing with a suitable instrument reminders and information regarding the medication regimen. As shown in FIG. 2, a medication form 34 and an emergency/medical form 36 are removably carried at the rear of the plate 12.

Figure 11:
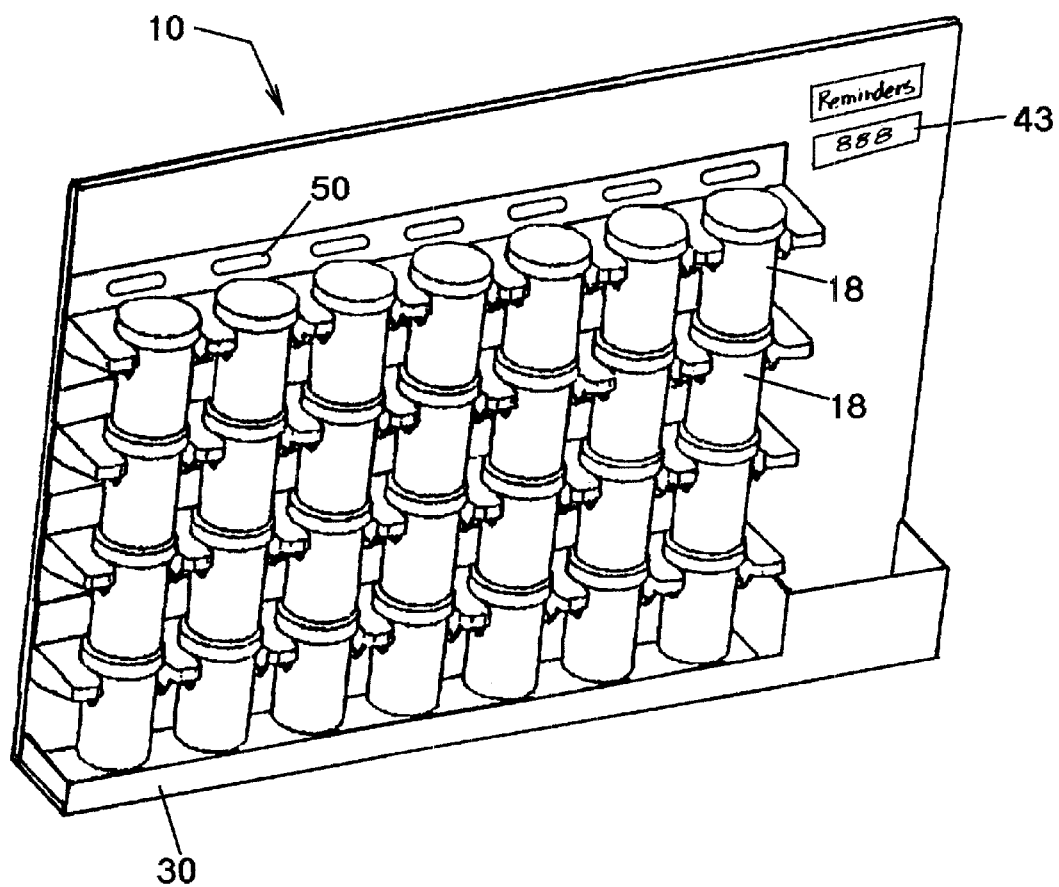
FIG. 11 is a front perspective view of an embodiment of the organizer shown in FIG. 1.

The containers 18 include a transparent cylindrical body 40 having a removable lid 42. The containers 18 are appropriately sized to carry and dispense a variety of medication formats including pills, capsules, elixirs, patches and like room temperature medications. Inasmuch as patches are generally applied at the beginning of the day, the first row of racks may be disposed to carry a container sufficiently large to hold the patches, whereas the remaining rows may be sized for the reception of the other medication formats. Alternatively as shown in FIG. 11, the containers 18 may be similarly sized with slots 50 or other suitable apertures being provided for releasably holding the patches required for each day. A digital clock/calendar 43 may also be mounted on the organizer.

The container sizes may vary depending on need. The lids 42 may be of a child proof, pivotally or slidably attached, snap-on, twist-on or other variations convenient for the user.

The support assembly comprises a front panel 60, a rear panel 62 laterally spaced by vertical slat 64 and base slat 66 to define vertically upwardly opening slots 67, 68 for slidably receiving the forms as described in greater detail below. Preferably the panels and slats are formed of a plastic material and adhesively or mechanically connected in assembly.

The supply tray 30 includes a forwardly extending base 70 surrounded by an upwardly extending peripheral rim 72 including side walls 74, 76 and a generally L-shaped front wall 78. The base 70 is mechanically or adhesively connected to the front panel. The rim 72 is mechanically or adhesively connected to the front panel. The front wall 78 includes a left side wall portion aligned with the racks and containers and an enlarged right side portion below the reminder area 32 of the organizer. An intermediate wall 83 extends upwardly from the base 70 between the front panel 60 and the wall portion and establishes a supply receptacle disposed at the lower corner of the front plate and sized for carrying peripheral medical supplies or medications such as inhalers, drops or other "as-needed" medications, as well as a marker for inscribing instructions in the reminder area. The reminder area 32 is intended to display information related to medications not housed in the individual containers such as insulin, ointments, inhalers and the like. Reminders regarding proper ingestion and use of the medications contained in the individual containers may also be written in the reminders area. For plastic materials a dry erase marker may be used for such reminders and attached by flexible means to the organizer or carried in the tray or elsewhere.

The racks 14 are elongated one-piece plastic moldings having a horizontally extending vertically disposed base 80 engaging the front panel and a front ledge 81 having a plurality of forwardly projecting uniformly longitudinally spaced distal arms 82 defining therebetween generally U-shaped forwardly opening container receiving slots 84. Referring to FIG. 3, the slots 84 are defined by a semi-circular cylindrical base wall 86, side walls 88 and entry walls 90. The base wall 86 and side walls have a diameter and spacing, respectively, that is slightly larger than the base of the container whereby the latter is loosely confined thereby in the stowed positions. The entry walls 90 are inwardly spaced from the side walls 88 at a distance providing a light interference fit with the base of the container, thereby providing limited resistance to insertion of the container to the stowed position and removal therefrom for use, while providing detenting against inadvertent movement during storage.

Referring to FIG. 1, the rear surface of the base 80 of the rack 14 engages the front surface 16 of the front panel 60. A plurality of mounting holes 90 are aligned in laterally spaced vertical columns and horizontally spaced rows. The racks are mechanically fastened to the front panels by fasteners 92 disposed at the preformed holes. Accordingly, depending on the height of the containers desired for a daily dosage time, the racks may be appropriately vertically spaced. Referring to FIG. 1, the rack orientation provides for the tallest row of containers to be disposed for use in the morning dosage time thereby enabling storage of patches in the larger containers at the usual time for their application. The remaining racks provide for reception of ordinary containers for general pills, tablets and elixirs.

The medications information slot 67 and emergency/medical information slot 68 are configured to slidably receive and capture forms with a heading thereof projecting above the top of the front panel for identification purposes. As shown in FIGS. 7 and 8, the medication information form 34 comprises a front panel 102 and rear panel 104 both of which contain an upper header section 106 entitled "Medications". The front panel provides an upper legend area 108 for entry of patient name and a numbered tabular section 110 for entering relevant information, such as drug name, dose, administration route, frequency, and relevant comments. The front panel includes a lower legend area 112 for entering information about other medications not carried in the container such as refrigerated medications, inhalers, drops, ointments and medications for occasional use and carried in the supply tray. The front panel also includes a verification section 113 for entry of the preparer's name and date prepared.

The rear panel 104 includes a similar header section 116 and a replication in tabular form 118 of the container layout setting forth week days and dosage times. For each day and each dosage time, the relevant information regarding the correctly prescribed medication is entered based on information on the front panel. This provides a convenient on site reference for filling the containers in chart format.

As shown in FIGS. 9 and 10, the Emergency/Medical form 36 includes a front panel 122 and a rear panel 124. The front panel 122 includes a header section 123 entitled "Emergency/Medical". Below the header section is a legend area 126 for entry of identifying information regarding the patient and emergency notification information. Below the legend area is a Medical Information legend 128 for entry of specific medical and surgical information relative to the patient. Provided below the medical information legend is a Medications table 130 for entering and updating medications prescribed for the patient and information relevant thereto. Below the medications table is a Doctors legend 132 for listing information regarding treating physicians for the patient.

The information on the front panel of the form is a particularly beneficial compilation for use by the patient, associated care givers, and health care providers as a communication tool. The panel provides complete and accurate medical and emergency information designed to streamline communication and enhance safe care. The form may be taken to medical appointments, emergency room visits, hospital admissions or used by emergency personnel in answering 911 calls. Patient safety is greatly enhanced as it communicates medical and emergency information in a succinct, accurate and concise formate thereby avoiding the need for patient recall of health history, treating physicians or current treatments.

The rear panel carries a similar header section 140 and a plurality of information legends 142 for entry of access information for reference by the patient or third parties, for general use and in case of emergency. Common numbers of emergency services are provided, utility information, family contacts, neighbors and personal requests by the patient provide invaluable information for handling emergency situations involving the patient.

The organizer 10 is intended for placement in a regularly visited, easily accessible place for the elderly or impaired person wherein the layout of medication containers, the day, the time of day, reminders and data panels can be readily viewed for use, status, compliance and information. The organizer 10, as shown in FIGS. 1 and 2, is provided with a generally rectangular backing plate 62. Adjacent the upper ends and symmetrically disposed between the sides, a pair of mechanical fastening apertures 150 are provided, each of which includes a circular base hole 154 and an inverted U-shaped shank slot 156. These apertures permit mounting of the organizer 10 on a suitable vertical surface wherein horizontally aligned, appropriately spaced fasteners are inserted into the base hole 154 and the organizer shifted downwardly with the shank of the fastener residing in the shank slot 156, all in a well known manner. The rear plate is also provided with three symmetrically disposed sheet magnets 160 adhesively adhered to the rear surface thereof. The magnets 160 have sufficient strength to enable the organizer to be supported on a vertical ferromagnetic surface such as a refrigerator door.

The hole patterns for the container racks permit selective vertical adjustment to permit containers of different lengths to be utilized. Such feature is extremely desirable inasmuch as it permits widely used patch medications to be stored in the containers along with tablet, capsule and elixirs. It has been found that most patch medications are adhered at the start of the day, i.e. morning. Accordingly it is preferred to dedicate three mounting hole arrays for fixed mounting of the racks for the noon, afternoon, and evening medications and permit the upper or morning rack to be shifted to the upper hole pattern for handling the larger containers suitable for housing such patches.

The aforementioned legends denoting the day of the week, time or dosage, and reminders may be provided by adhesive labels, integrally molded characters, providing space for hand entry, or the like. In particular, the time of dosage may comprise and integral part of the rack base or be a removably attached item. In the preferred embodiment, the legend is integral with the rack. It will be appreciated that those patients not on a four times a day medication regiment may remove unneeded racks thereby providing additional storage for peripheral items and medications on the lower tray.

As previously mentioned the containers are in two different sizes but may be of any suitable size or shape such as oval, rectangular, or square. Such container shapes and sizes are easily handled by the elderly and are sufficiently large to hold pills, tablets, capsules, elixirs, and patches.. Such containers are available with varying lid designs, including child-resistance lids and snap-on. The lids and the containers may also bear discrete indicia using labels or embossing designating by text, color and symbols the date and time of dosage for the days contents.

The medication organizer in controlled testing has demonstrated increased compliance and improved communication with medical professionals and caregivers.

Test 1—Medication Compliance

A cross over design study included 25 participants and compared the medication compliance organizer in accordance with the present investigation and a standardized pillbox. The participants ranged in age from 60 to 89 years with an average age of 75 years. 84% were female and 16% were male. 48% were Afro-American and 52% were Caucasian. All participants lived in rural eastern North Carolina. The majority of the participants were socio-economically disadvantaged. The participants were observed over a six week period on each device. The study determined the participants were 60% more compliant with organizer, 32% more compliant with the pillbox, and 8% showed no difference in compliance. Memory scores were evaluated against rates of compliance using Folstein's Mini Mental Exam. The study revealed that participants with lower memory scores did better using the organizer than with the pillbox indicating that those with mental deficits were assisted with the organizer.

Test 2—Information Formatting

The "Emergency/Medical" form housed in the organizer was evaluated for effectiveness in communicating pertinent medical information specific to the user. During the study, participants were asked to take their forms with them to all physician appointments, hospitalizations, and emergency room visits. Attending physicians were then sent a questionnaire requesting them to rate the form with respect to its accuracy in describing the participant's health status, usefulness in conveying medical information and ability to reveal useful information about the participant's health status. As to each category, the physicians rated the form extremely high thereby validating its efficacy as a communication adjunct in terms of health care and safety where clear communication between individuals, caregivers, and health care providers is paramount for effective and safe health care.

Surveys conducted with the participants, care givers and registered nurses involved in the study also demonstrated efficacy of the organizer for the visually impaired, i.e. macular degeneration and cataracts, improved handling for those with dexterity impairments, improved compliance with peripheral medications detailed in the reminder section of the organizer, and assistance in accurately filling the medication containers.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

REFERENCES

1. Botelho, R J et al., Home assessment of adherence to long-term medication in the elderly, Journal of Family Practice, July 1992:61–5.
2. Urquart, J, Patient non-compliance with drug regimens: measurement, clinical correlates, economic impact, European Heart Journal, March 1996: 17 Suppl A:8–15.
3. Wandless I et al., Can drug compliance in the elderly be improved?, British Medical Journal, Feb. 5, 1977, 359–361.
4. Scott, L, Providers push for remedies to costly drug non-compliance, Modern Healthcare, April 1996, 44–50.

5. Blenkiron, P, The elderly and their medication: understanding and compliance in a family practice, Postgrad Med J, 1966, 72:671–676.
6. Ware, G J et al., Unit does calendar packaging and elderly patient compliance, New Zealand Medical Journal, November 1991, 495–7.
7. Dennehy, C E et al., Drug-related illness in emergency department patients, American Journal of Health-System Pharmacy, Jun. 15, 1996, 12: 1422–6.
8. Muirhead, G, New York pharmacists to work with nurses on compliance, Drug Topics, May 1996, 140 n 9:92–8.
9. Baum, C et al., Drug use in the United States in 1981, JAMA, 1984, 241(10), 1293–7.
10. Haynes, R B et al, Systematic review of randomized trials of interventions to assist patients to follow prescriptions for medications, Lancet Aug. 10, 1996, 348 (9024), 383–6.
11. Day, J C, Population of the United States by Age, Sex, Race, and Hispanic Origin: 1993–2050, United States Bureau of the Census, Current Population Reports, United States Printing Office, 1993.
12. Wong, B S W et al., Evaluation of a Novel Medication Aid, the Calendar Blister-Pak, and its effect on drug compliance in a geriatric outpatient clinic, JAGS, 1987, 35:21–6.
13. Craven County Chamber of Commerce, NC, phone interview.
14. Projected Population, May 1993, North Carolina Data Center.
15. North Carolina Comes of Age, County Profiles in Aging, CARES, Chapel Hill, NC, 1990.

What is claimed:

1. A method for organizing compliance with a medication regimen for an individual taking medications in varying formats for each weekday and at a plurality of medication times wherein the formats comprise tablets, capsules, and elixirs, said method comprising the steps of: providing a plurality of containers for each weekday and medication times, said containers being characterized by a cylindrical body having an internal space for receiving said formats and having an enlarged removable cylindrical cap having a lower annular surface adjacent said body; providing a generally rectangular support assembly; mounting said support assembly on a vertical surface; providing in side-by-side relationship on a front surface of said support assembly a container area and a reminder area; providing a plurality of vertically spaced rack members on said front surface in said container area corresponding to said discrete medication times, said rack members having frontally opening U-shaped slots therein corresponding to said discrete weekdays wherein said slots in each rack member are vertically aligned for each discrete weekday, each slot being defined by laterally spaced arms for slidably receiving said body of said container and supporting said lower annual surface of said cap on top surfaces thereof; labeling each of said container with indicia of a discrete weekday and discrete medication time; filling each of said containers with a format corresponding to said discrete weekday and said discrete medication time; filling each container with a format corresponding to a medication regimen for said indicia on said container; sliding said containers into said slots in accordance with said indicia; providing a writing surface in said reminder area for the erasable inscription of messages related to the medications of the user; providing first and second upwardly opening pockets at the rear surface of said support assembly; providing in said first pocket a medication form designating the individual, medication regimen and the contents to be carried by each individual container; and providing in said second pocket an emergency/medical form identifying the user and information associated therewith for use during routine and emergency situations; and providing a forwardly projecting shelf at the lower end of said support assembly below said reminder area non-refrigerated medications and supplies for said user.

2. The method as recited in claim 1 including providing inwardly spaced projections at the front of said slots having a light interference fit with said body of said container thereby providing limited resistance to insertion of said container and removal of said container from said slot.

3. The method as recited in claim 1 including providing fastener means for removably attaching said rack members to said support assembly.

4. The method as recited in claim 1 including providing an upwardly projecting retaining wall at the front of said shelf for retaining said non-refrigerated medications and supplies.

5. The method as recited in claim 1 wherein said medication form presents said regimen in a format corresponding to said weekdays and said medication times.

* * * * *